United States Patent
Witoff et al.

(10) Patent No.: US 12,537,670 B2
(45) Date of Patent: Jan. 27, 2026

(54) KEY SHARD VERIFICATION FOR KEY STORAGE DEVICES

(71) Applicant: Unit 410, LLC, San Antonio, TX (US)

(72) Inventors: Robert Witoff, San Antonio, TX (US); Drew Rothstein, San Antonio, TX (US); Alex Miller, San Antonio, TX (US); Grant Slape, San Antonio, TX (US)

(73) Assignee: Unit 410, LLC, San Antonio, TX (US)

( * ) Notice: Subject to any disclaimer, the term of this patent is extended or adjusted under 35 U.S.C. 154(b) by 167 days.

(21) Appl. No.: 18/652,801

(22) Filed: May 1, 2024

(65) Prior Publication Data

US 2025/0343675 A1 Nov. 6, 2025

(51) Int. Cl.
- *H04L 29/06* (2006.01)
- *H04L 9/08* (2006.01)
- *H04L 9/30* (2006.01)
- *H04L 9/32* (2006.01)

(52) U.S. Cl.
CPC ............ *H04L 9/0825* (2013.01); *H04L 9/302* (2013.01); *H04L 9/3247* (2013.01)

(58) Field of Classification Search
CPC ...... H04L 9/0825; H04L 9/302; H04L 9/3247
See application file for complete search history.

(56) References Cited

U.S. PATENT DOCUMENTS

| | | | | |
|---|---|---|---|---|
| 11,190,344 B2 * | 11/2021 | Peddada | ............... | H04L 9/3247 |
| 2018/0183777 A1 * | 6/2018 | Guillory | ............... | H04L 63/061 |
| 2020/0178080 A1 * | 6/2020 | Yasaki | ................ | H04L 9/0822 |
| 2021/0058259 A1 * | 2/2021 | Le Saint | .............. | H04L 9/0825 |
| 2022/0141014 A1 * | 5/2022 | Britto | ................... | H04L 9/3073 380/286 |

(Continued)

FOREIGN PATENT DOCUMENTS

| CN | 110574335 B | * 11/2022 | ........... H04L 9/0861 |
|---|---|---|---|
| CN | 116097615 A | * 5/2023 | ........... H04L 9/0844 |

(Continued)

OTHER PUBLICATIONS

Aanandaram, "Blockchain-based Digital Identity for Secure Authentication of IoT Devices In 5G Networks," 2024 Third International Conference on Intelligent Techniques in Control, Optimization and Signal Processing (INCOS), India, 2024, pp. 1-6. (Year: 2024).*

*Primary Examiner* — Sher A Khan
(74) *Attorney, Agent, or Firm* — Foley & Lardner LLP

(57) ABSTRACT

In certain embodiments, verification operations are performed. A first device packaged with a second device may store a first key shard and a second key. The first key shard may be a same key shard as a corresponding key shard stored on the second device, where the second key is different from a corresponding key stored on the second device. Additionally, the first key shard and the corresponding key shard are associated with a user. In connection with a request from a web service, the first device or a computing device may generate a response to the request using the second key by identifying the second key using an identifier of the request. Furthermore, the first device or the computing device may send the response to the web service, where the web service confirms registration of the first key shard based on the response.

20 Claims, 5 Drawing Sheets

(56) References Cited

U.S. PATENT DOCUMENTS

| | | | |
|---|---|---|---|
| 2023/0089865 A1* | 3/2023 | Peddada | H04L 9/0827 380/282 |
| 2024/0121083 A1* | 4/2024 | London | H04L 9/30 |
| 2024/0283664 A1* | 8/2024 | Islam | H04L 9/3271 |
| 2025/0317302 A1* | 10/2025 | Witoff | H04L 9/0825 |

FOREIGN PATENT DOCUMENTS

| | | | | |
|---|---|---|---|---|
| CN | 116941220 A | * | 10/2023 | H04L 9/3263 |
| JP | 2008167107 A | * | 7/2008 | |
| KR | 20230095947 A | * | 6/2023 | H04L 9/3263 |

* cited by examiner

300

308 — Receive Challenge Request From Web Service At Client Computer In Communication With At Least One Device Of A Set Of Devices Storing First Key And Second Key

312 — Generate Challenge Response Using Second Key Based On Challenge Request

320 — Send Challenge Response To Web Service

FIG. 3

KEY SHARD VERIFICATION FOR KEY STORAGE DEVICES

SUMMARY

Methods and systems are described herein for improvements to the security of physical key storage memory devices. Multifactor authentication requiring a physical key device plays a critical role in the security of data systems across a variety of industries, such as logistics, information technology, and finance. These physical key devices are susceptible to interception and unauthorized manipulation, especially prior to a physical key device reaching its authorized user. In a typical scenario, an unauthorized entity intercepts the physical key device. The intercepting entity then substitutes the original with a counterfeit device, identical in appearance but containing a different key. The replacement key, controlled by the intercepting entity, corresponds to a different account also under their control. This deception can lead to the authorized user inadvertently using the compromised device, thinking it is the legitimate one. Such breaches can have severe repercussions, including unauthorized access to sensitive data, physical or virtual assets, and the potential for other forms of malicious activities. Furthermore, conventional attempts to verify a key are hampered when a key has been sharded, as various conventional key verification operations require the collection of enough key shards to reconstruct the original private key.

To overcome these technical deficiencies in preexisting systems, devices, systems, and methods disclosed herein facilitate device security via key-based verification operations. Some embodiments may include a set of batteryless security devices packaged together for secure redundancy-based remote registration of an encryption key or key shard via cryptographic verification of receipt of an authentication key stored on the set of devices. In some embodiments, the set of devices may include a first and a second device associated with a user, wherein each of the first and second devices include an encryption key identical across the first and second devices. Each respective device of the set of devices also stores a respective authentication key for registering the encryption key, the respective authentication key being different from the other devices of the set of devices. In some embodiments, the encryption keys and the authentication keys of the first and second devices may be derived from a same key and associated with the user. Furthermore, in the case where a private key has been sharded, conventional public-private key verification schemes may make verification of a single shard impossible in cases where all the shards of that private key are unavailable.

Additionally, the set of devices may include memory storing instructions that cause one or more processors to perform operations for authenticating a set of keys stored on the set of devices. A computing device may receive, from a web service used to confirm registration of an authentication key, a challenge request related to registering the encryption key. In connection with the challenge request, the computing device can identify the authentication key of the first device using a key handle of the challenge request. Some embodiments may then retrieve a signing private key and a verification public key associated with the authentication key. Some embodiments may then generate a challenge response to the challenge request by signing a challenge of the challenge request using the signing private key. For example, some embodiments may generate a digital signature with the signing private key and then respond to the challenge request with a message signed with the digital signature. Some embodiments may then send the challenge response to the web service. The web service may then confirm registration of the encryption key of the first device in response to the web service verifying the challenge response using the verification public key.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRA WINGS

FIG. 3 shows a flowchart of a process for using a key-storing device to verify a key, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details, or with an equivalent arrangement. In other cases, well-known structures and devices are shown in block diagram form in order to avoid unnecessarily obscuring the embodiments of the invention.

Figure 1:
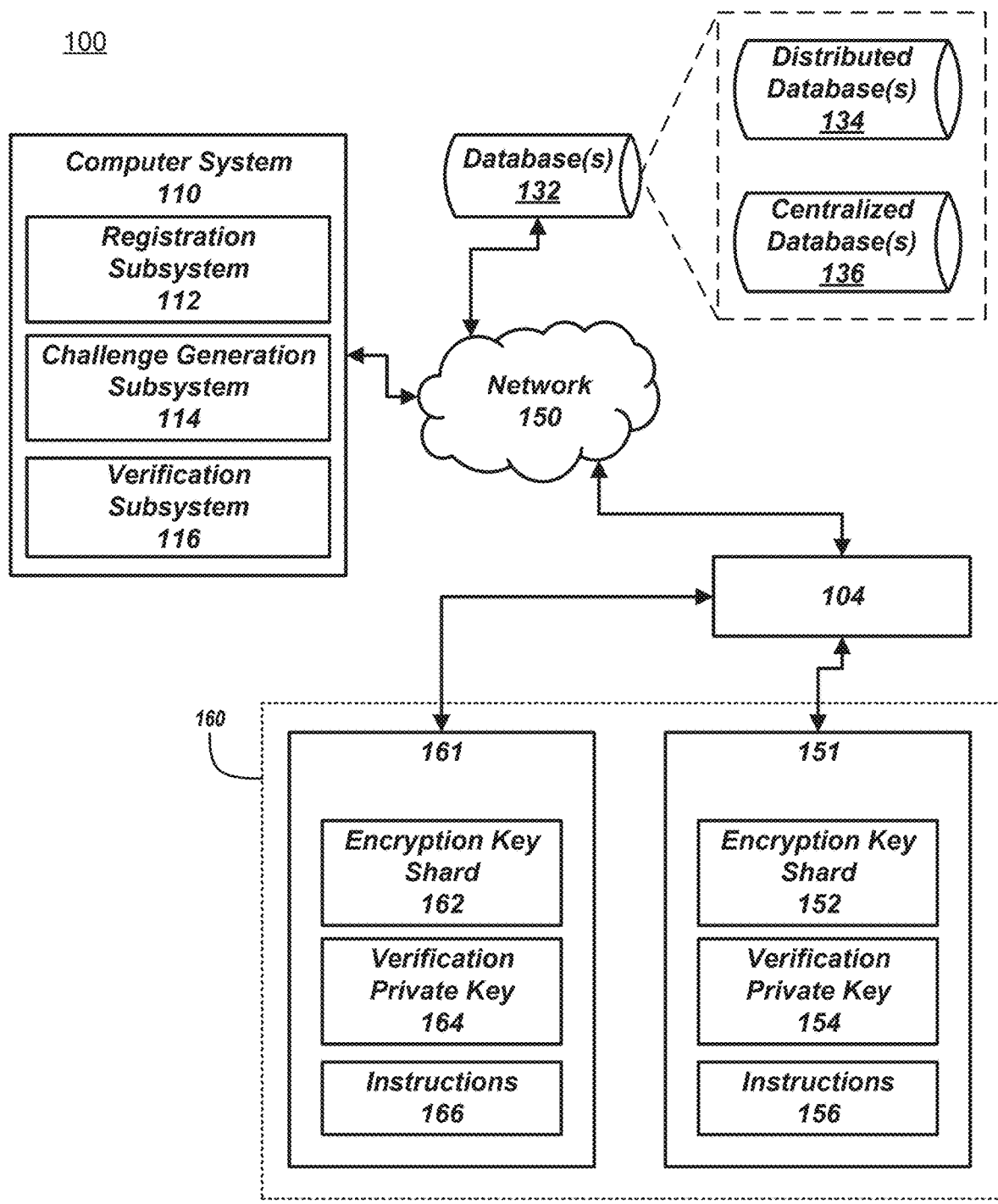
FIG. 1 shows a system for facilitating secure use of a physical key device, in accordance with one or more embodiments.

FIG. 1 shows a system 100 for facilitating secure use of a physical key device, in accordance with one or more embodiments. As shown in FIG. 1, system 100 may include a computer system 110, a client device 104, or other components. Computer system 110 may include a registration subsystem 112, a challenge generation subsystem 114, a verification subsystem 116, or other components. The client device 104 may include any type of mobile terminal, fixed terminal, or other device. By way of example, the client device 104 may include a desktop computer, a mobile computing device (e.g., a laptop computer, a tablet computer, a smartphone, a wearable computing device), or other client device. A user may use the client device 104 to interact with other client devices, one or more servers, or other components of the system 100. Furthermore, a set of batteryless security devices 160 may receive data from and transfer data to the client device 104, where such data may include private keys.

It should be noted that, while one or more operations are described herein as being performed by particular components of computer system 110, those operations may, in some embodiments, be performed by other components of computer system 110 or other components of system 100. As an example, while one or more operations are described herein as being performed by components of computer system 110, those operations may, in some embodiments, be performed by one or more components of the client device 104.

As discussed, key devices play an important role in multifactorial authentication and other applications prioritizing security. Consequently, the interception and subsequent physical possession of a key device by a malicious third party can pose significant, undetected risks to a user. For example, a malicious third party can intercept an original key device and replace the key device with a compromised key. Once the user uses the compromised key, the malicious entity may gain access to whatever assets the original key device was designed to access. While visual markings and sealing stickers can be used to reduce such risks, such physical security measures can be impractical, imitated by the malicious entity, or simply overlooked by a user.

In some embodiments, a set of batteryless security devices 160 may be packaged together and physically sent to a user (e.g., via a courier service). The set of batteryless security devices 160 may store an encryption key shard that is identical between the pair of key-storing devices but store authentication key shards that are unique to each device. For example, a first key-storing device that is packaged with a second key-storing device can store a first Rivest-Shamir-Adleman (RSA) private key (e.g., an encryption key shard) and a second RSA private key (e.g., an authentication key shard). Some embodiments may then use a verification process involving using the second RSA private key to answer a challenge response issued by a web service. As described elsewhere in this disclosure, some embodiments may verify a challenge response and confirm the registration of the first RSA private key for the first key-storing device. Furthermore, some embodiments may confirm that the same RSA private key is stored on the other key-storing device packaged with the first key-storing device based on a configured parameter. Alternatively, some embodiments may require a separate testing operation for each key-storing device.

As described elsewhere in this disclosure, a set of key-storing devices storing encryption keys and authentication keys that are unique to each device may be used for registration verification. As a part of this process, a web service may send a challenge request to a client device in communication with at least one key-storing device of the set of key-storing devices. The client device may then identify the key to use (e.g., the authentication key) based on an identifier of the challenge request. For example, a client device may attempt to first verify that an encryption key is an originally registered encryption key by sending a message (e.g., a challenge initiation message) to a web service. The web service may then send a challenge request (e.g., a nonce message) back to the client device. In response to receiving the challenge request, the client device can then use the authentication key stored on the key-storing device to generate a cryptographic signature and send the cryptographic signature to a server. As described elsewhere in this disclosure, some embodiments may then confirm that the first device stores the originally registered encryption key based on the cryptographic signature generated from the authentication key.

In some embodiments, the set of key-storing devices used for confirming the registration of a key-storing device may be used to generate a challenge response. After a client device or a key-storing device generates the challenge response using a key stored on the key-storing device, the client device can then send the challenge response back to a web service. The web service may then determine whether the challenge response to satisfies a set of criteria to verify the challenge response. For example, a client device may generate a challenge response using an authentication private key stored on a key-storing device and send the challenge response to a web service. The web service may access a record in a shard-storing database to verify the challenge response with a verifying public key stored in the shard-storing database. The web service may further retrieve additional values in the record and update a database to indicate that an encryption key shard also associated with the user is verified.

Subsystems 112-116

In some embodiments, a registration subsystem 112 may generate a new key pair and register the key pair in a database, such as the database(s) 132. For example, the registration subsystem 112 may generate a set of random values and use a set of cryptographic algorithms (e.g., Elliptic Curve Cryptography (ECC)) to generate private and public keys. Furthermore, the registration subsystem 112 may shard a user-associated private key into a set of key shards. For example, some embodiments may shard a private key into five different key shards using a Shamir's Secret Sharing algorithm. Some embodiments may then map the private key shards (or identifiers representing the private key shards), corresponding public key, and user with each other in a database. For example, the registration subsystem 112 may generate a public-private key pair and shard the private key of the pair into a first key shard, a second key shard, and a third key shard. The registration subsystem 112 may then assign shard identifiers to each of the shards without storing the key shards. The registration subsystem 112 may then map these shard identifiers with the corresponding public key and an associated user (e.g., via a record or other data structure). For example, some embodiments may register keys in a database by generating, a database record to be stored in the database, where fields of the database record are populated with the shard identifiers, corresponding public keys, and user identifier.

In some embodiments, multiple key types related to different applications may be associated with each other in a database or other type of data structure. For example, some embodiments may generate an encryption key pair for a first application, an authentication key pair for a second application, and a private key pair for a user. After key pair generation, the one or more private keys of the generated key pairs may be sharded. For example, some embodiments may shard the private key of the encryption key pair and the authentication key pair while not sharding the private key of the verification key pair. Some embodiments may populate a database with a set of records, where each respective record includes a unique encryption key shard identifier, the public encryption key, an identifier of a private authentication key shard, a public authentication key, an identifier of a verification private key, a public verification key, and a user identifier. As described elsewhere, some embodiments may then use this database to determine whether a device related to a particular key shard is registered based on a determination of whether a corresponding private authentication key was used. Thus, some embodiments may determine that a key shard on a candidate device is already registered even when the entire collection of a group of key shards is unavailable for authentication.

In some embodiments, a challenge generation subsystem 114 may generate a new challenge request in response to a challenge initiation message. For example, a user may access a web portal and interact with a user interface (UI) to send a challenge initiation message to a web service. The challenge generation subsystem 114 may generate a challenge request and send the challenge request to the user. For example, after receiving a challenge initiation message from a user via the client device 104 during a data session, the challenge generation subsystem 114 may generate a random value for use as a challenge request. The challenge generation subsystem 114 may then send the challenge request to the client device 104 and, as discussed elsewhere in this disclosure, receive a challenge response related to the challenge request. As described elsewhere, the challenge generation subsystem 114 may also keep track of a user identifier, session identifier, or other information for use as additional security measures.

In some embodiments, a verification subsystem 116 may verify a challenge response sent by the client device 104. The challenge response may be related to the challenge request and derived from the challenge request. For example, the challenge response may include the contents of the challenge request (e.g., a nonce value), a client-provided public key, and an encrypted hash of the challenge request. The verification subsystem 116 may then retrieve a public authentication key associated with the user, determine that the public authentication key matches the client-provided public key, and decrypt the encrypted hash with the retrieved public authentication key. The verification subsystem 116 may then hash the original value of the challenge request to generate a comparison value and compare this comparison value with the decrypted hashed value to verify the challenge response. After authenticating the challenge response, the verification subsystem 116 may then indicate that an encryption key shard that is mapped to the encryption key is secured. For example, some embodiments may use a record storing an authentication public key to first determine that a challenge response is verified, and determine that a key shard identifier (e.g., a key handle identifying the particular key shard) is stored in the same record. In response to retrieving the identity of a related key shard, the verification subsystem 116 may confirm the registration of the related key shard.

Some embodiments may be configured to simultaneously confirm the registration of additional devices based on a challenge response. For example, some embodiments may receive a challenge response from the client device 104, where the challenge response was generated by the client device 104 using a verification private key 154. Some embodiments may then concurrently indicate that a first batteryless security device 151 has been received and that a second batteryless security device 161 has been received.

Device-Related Instructions

In some embodiments, a set of batteryless security devices 160 including a first batteryless security device 151 and a second batteryless security device 161 may be in the physical possession of a user. The first batteryless security device 151 may store an encryption private key shard 152, the verification private key 154, and instructions 156. Similarly, the second batteryless security device 161 may store an encryption private key shard 162, the verification private key 164, and instructions 166. In some embodiments, the encryption private key shards may instead be encryption private keys.

In some embodiments, the instructions 156, the instructions 166, instructions on the client device 104, instructions provided to the client device 104 via the computer system 110, or other instructions may cause the client device 104 to perform operations to verify keys or key shards. For example, the client device 104 may communicate with the computer system 110 to verify the encryption private key shard 152, the encryption private key shard 162, or other key data. Some embodiments may cause the client device 104 to send a challenge initiation message to the computer system 110. The challenge initiation message may include information to specify what kind of challenge request or what key is being targeted. For example, the challenge initiation message may indicate a particular key or key shard.

In response to receiving the challenge initiation message, the computer system 110 may send a corresponding challenge request. The client device 104 may identify an authentication key shard using a key handle of the challenge request, where the key handle may be an identifier that is unique to a key or key shard. After retrieving the authentication key shard based on the key handle, the client device 104 may retrieve a signing private key and a verification public key associated with the authentication key shard.

In some embodiments, the client device 104 may generate a challenge response by signing a challenge of the challenge request using the signing private key. For example, some embodiments may receive a challenge request that includes a randomly generated value as part of the challenge of the challenge request. The client device 104 may then sign the challenge with the verification private key 154 by hashing the randomly generated value (e.g., with a hashing algorithm such as SHA-256) and then encrypting the hashed message with the verification private key 154.

As discussed elsewhere, a key-storing device may include multiple keys or key shards (e.g., one or more key shards and one or more keys that are not shards of another key, multiple keys that are not shards of another key, multiple key shards, etc.). In some embodiments, a challenge request may include a key handle or other identifier of a key or key shard. Some embodiments may then determine a corresponding key pair used to verify the presence of the key shard, where the corresponding key pair may be mapped to the key or key shard identified in the challenge request. For example, a challenge request may include a key handle for an authentication key shard. In response, some embodiments may determine that the authentication key shard maps to a key pair that includes a signing private key a verification public key. In response, some embodiments may generate a challenge response based on the signing private key (e.g., encrypting one or more values with the signing private key) and send the challenge response and the verification public key to a server for verification operations. To determine that a first key or first key shard maps to a second key, some embodiments may rely on instructions or other data stored in the memory of a key-storing device. Alternatively, or additionally, some embodiments may use a database or other data store stored on a client device (e.g., the client device 104) to determine that a first key or key shard maps to the second key.

Furthermore, some embodiments may use multiple private keys that are mapped different other key or key shards. For example, a first key shard on a key-storing device may map to a second key, and a third key shard on a key-storing device may map to a fourth key. Some embodiments may generate a challenge response based on the second key in response to receiving a challenge request that includes a key handle for the first key shard and generate a challenge response based on the fourth key in response to receiving a challenge request that includes a key handle for the third key shard. By using multiple mappings for different keys, some embodiments may increase protection for user privacy and reduce the likelihood that a key-storing device becomes a high-value target for theft.

Some embodiments may perform different operations based on the type of information in a challenge request. For example, some embodiments may receive a nonce value in a challenge request, use a private key stored on a key-storing device to encrypt the nonce value, and use the encrypted nonce value in a challenge response related to the challenge request. Alternatively, or additionally, some embodiments may decrypt the contents of a challenge response, perform a set of operations (e.g., perform a set of arithmetic operations, add a digital signature, perform a hashing operation), and then generate a challenge response that includes the result of the set of operations.

Figure 2:
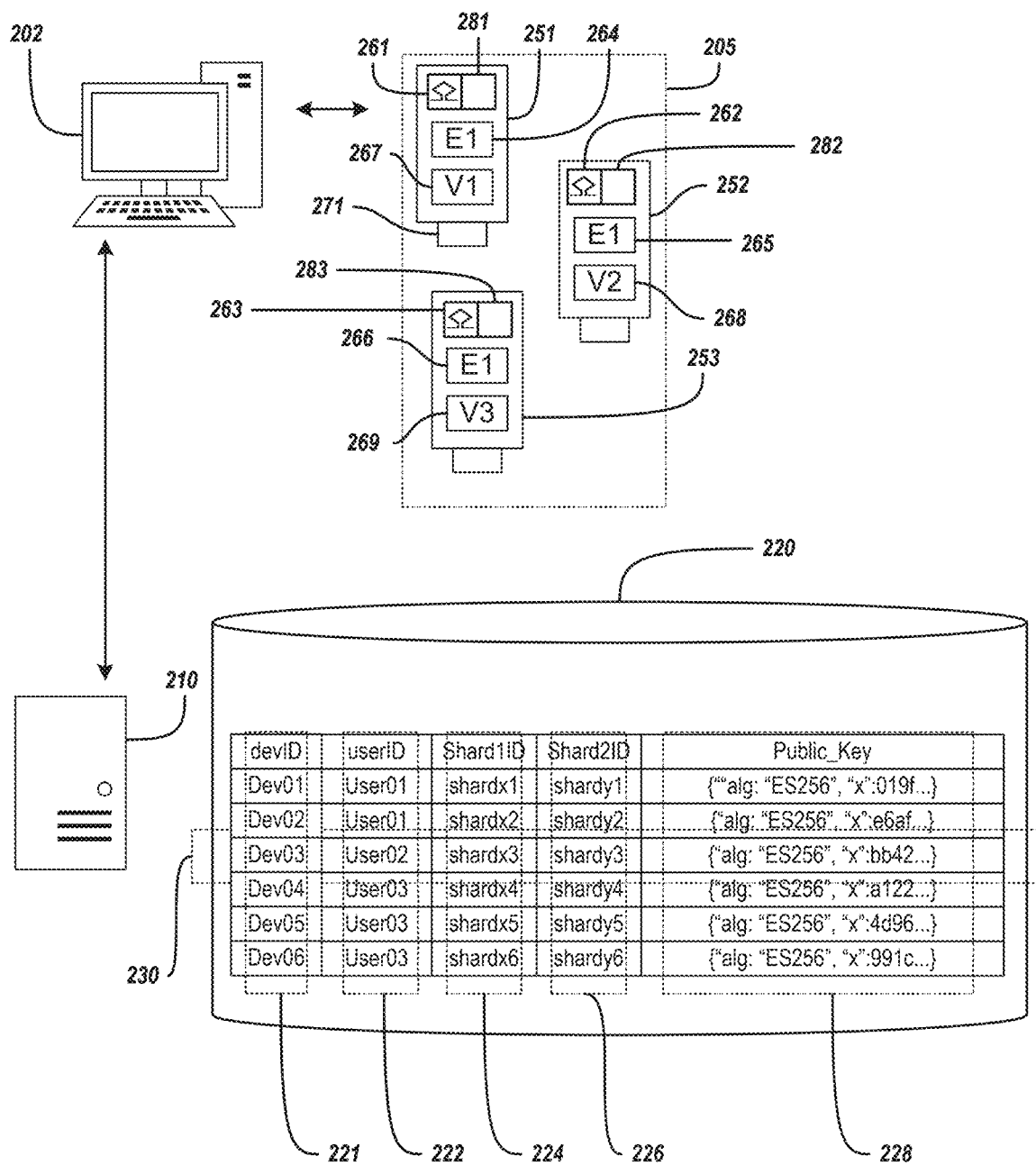
FIG. 2 shows an illustrative diagram for confirming of the registration of key shards based on a public key, in accordance with one or more embodiments.

FIG. 2 shows an illustrative diagram for confirming the registration of key shards based on a public key, in accordance with one or more embodiments. In some embodiments, a user can obtain physical possession of a set of batteryless key-storing devices 205, which includes a first device 251, a second device 252, and a third device 253. The set of batteryless key-storing devices 205 may store multiple types of keys or perform operations related to the stored keys. For example, the first device 251 may store a first encryption key shard 264 and a first verification key 267, the second device 252 may store a second encryption key shard 265 and a second verification key 268, and the third device 253 may store a third encryption key shard 266 and a third verification key 269. It should be understood that, in other embodiments, a key instead of a key shard may be stored (e.g., the first device 251 may store a full key in lieu of the first encryption key shard 264).

In some embodiments, different devices may store the same key values for certain keys or key shards, store different keys or key values for certain keys or key shards, or store a mixture of shared and unique keys or key shards. For example, the first encryption key shard 264, the second encryption key shard 265, and the third encryption key shard 266 may each be the same as each other. In contrast, the first verification key 267, the second verification key 268, and the third verification key 269 may all be different from each other. It should be understood that, in other embodiments, all keys or key shards stored on a set of devices may be unique. Furthermore, it should be understood that keys may be used in lieu of key shards for the purposes of being confirmed for registration. For example, each device of the three devices 251-253 may store the same key in lieu of or in addition to storing the same key shards.

In some embodiments, multiple key shards stored on a device may be derived from a same key. For example, some embodiments may store a first key shard and a second key shard, each of which may be derived from a same key. In response to a verification of one of these key shards, some embodiments may determine that the other key shard is also verified. As described elsewhere, the verification of a first shard stored on a device can be a strong attestation to the validity of other shards stored on the device if these other shards are derived from a same key as the first shard.

The set of batteryless key-storing devices 205 may transfer data to or obtain data from a user device 202. For example, the first device 251 may provide data to or obtain data from the user device 202 via a Universal Serial Bus (USB) connector 271. Alternatively, the first device 251 may provide data to or obtain data from the user device 202 via a wireless antenna 261. Similarly, the second device 252 and the third device 253 may communicate with the user device 202 via a wireless antenna 262 and a wireless antenna 263, respectively. Additionally, the first device 251 includes a processor 281 to perform one or more operations described in this disclosure. For example, the processor 281 may include a cryptographic processor designed to perform cryptographic operations, such as signing an input with a key. Similarly, the second device 252 and the third device 253 may respectively use a processor 282 and a processor 283 to perform cryptographic operations.

In some embodiments, the user device 202 can communicate with a server 210 during a communication session. A user may interact with a UI element (e.g., by clicking on a button) to send a challenge initiation message to the server 210, where the challenge initiation message may indicate a shard and a user identifier. For example, the user device 202 may send a challenge initiation message to the server 210 indicating an identifier for the first device 251 or the first encryption key shard 264. In response, the server 210 may generate a challenge request that causes the user device 202 to generate a challenge response. For example, the user device 202 may directly generate a challenge response by retrieving the first verification key 267 from the first device 251 and signing a message using the retrieved key. Alternatively, the server 210 may provide the challenge request to the first device 251 (e.g., via a USB connector or via the wireless antenna 261) and receive a signed message from the first device 251. For example, a web application hosted by the server 210 may first send a challenge request to the user device 202. The user device 202 may then send the contents of the challenge request to the first device 251 via the wireless antenna 261. The first device 251 may then use the processor 281 to cryptographically sign the contents of the challenge request with the first verification key 267. The first device 251 may then send the signed message back to the user device 202 via the wireless antenna 261. After receiving the signed message, the user device 202 may then send the signed message or another message based on the signed message to the server 210 as a challenge response.

In some embodiments, the challenge request may include additional information, such as a web address, a communication session identifier, or other types of data. For example, the user may access a web portal at a web address (e.g., an HTTPS web address) to submit a challenge initiation message. In some embodiments, the challenge request may then include the web address. For example, the server 210 may directly provide a challenge request that includes the web address. Alternatively, the user device 202 may modify the challenge request to include the web address. When the user device 202 or the first device 251 signs the contents, the user device 202 may use the contents as a hash input. For example, the user device 202 or the first device 251 may hash some or all of the web address if the contents include the web address. Alternatively, or additionally, the challenge request may include a session token of a communication session between the user device 202 and the server 210.

After receiving the challenge response, a web application hosted on the server 210 may retrieve a record from a database 220. The database 220 stores various records that identify key-storing devices (represented by column 221 having the field name "devID"), users (represented by column 222 having the field name "userID"), a first set of key shard identifiers (represented by column 224 having the field name "Shard1ID"), a second set of key shard identifiers (represented by column 226 having the field name "Shard2ID"), and public keys (represented by column 228 having the field name "Public_Key"). The server 210 may determine, from a value in the challenge response or a value associated with the challenge response (e.g., a user identifier, key identifier, key shard identifier, or device identifier), a record of the database 220. For example, a web application hosted by the server 210 may retrieve a record 230 based on obtaining a challenge response that includes the user identifier "User02," the shard type identifier "Shard1ID," and the shard identifier "shardx3." Some embodiments may then use the public key shown in column 228 of the record 230 (i.e., the element that includes an "x" element that begin with "bb42 . . . ") to decrypt the received challenge response.

After decrypting a received challenge response, the web application hosted by the server 210 may then verify the decrypted challenge response. Various types of operations may be performed to confirm whether the challenge response confirms that the correct key was used. For example, some embodiments may compare the decrypted challenge response with a previously sent nonce value. Based on a determination that the previously sent value matches the decrypted challenge response, some embodiments may confirm that a signing private key used to generate the challenge response matches the registered key. Some embodiments may then apply transitive logic to label all other keys and key shards associated with that signing private key in the database 220 as matching with a registered key or registered key shard identified in the database 220. Furthermore, based on the confirmation, the server 210 may indicate that the corresponding device is in the physical possession of an intended user in the database 220 or in another database.

FIG. 3 shows a flowchart of a process 300 for using a key-storing device to verify a key, in accordance with one or more embodiments. Some embodiments may receive a challenge request from a web service at a client computer that is in communication with at least one device of a set of devices storing a first key and a second key, as indicated by block 308. As discussed elsewhere, some embodiments may trigger a server-side application (e.g., a web application) to send a challenge request. Upon receiving the challenge request at a client computing device, some embodiments may then use the client computing device to retrieve a private key or other data stored on a key-storing device in communication with the client computing device. Alternatively, some embodiments may provide some or all of the values of a challenge response to a key-storing device to generate a digital signature or other encrypted data via the key-storing device.

Some embodiments may generate a challenge response using the second key based on the challenge request, as indicated by block 312. Some embodiments may generate a challenge response by hashing a hash input with a hashing algorithm, such as the SHA-2, SHA-3, RIPEMD or its variants (e.g., RIPEMD-160, RIPEMD-256, and RIPEMD-320), BLAKE2 (e.g., BLAKE2b and BLAKE2s), Whirlpool, etc. Some embodiments may then encrypt the resulting hash output based on a signing private key using an encryption algorithm, such as RSA, ECC, Diffie-Hellman Key Exchange, ElGamal, Digital Signature Algorithm (DSA), Integrated Encryption Scheme (IES), lattice-based cryptography algorithms, etc. For example, some embodiments may encrypt the hash output with an RSA key. Alternatively, or additionally, some embodiments may use digital signature generation based on the Edwards-curve Digital Signature Algorithm (EdDSA). For example, some embodiments may hash a private key to obtain a hashed key, split the hashed key into at least two portions, use the first hashed key portion of the hashed key as the new hashing key, and generate a nonce with the second hashed key portion of the hashed key. Some embodiments may then determine a combined value that combines the second hashed key portion with a set of challenge values (e.g., a sequence of numbers in the contents of the challenge response) obtained from the contents of the challenge response (e.g., by concatenating the two values). Some embodiments may then hash the combined value based on the first hashed key portion to determine at least a portion of the challenge response to be sent to a web application.

In some embodiments the hash input may include additional information, such as a web address, a communication session token, etc. For example, a web service may send a challenge request to a user computer device during a communication session between the web service and the user computer device. A hash input may include a session token representing the communication session or otherwise generated during the communication session. Some embodiments may then hash the hash input and then encrypt the hashed output, where the decryption of the hash input (e.g., by a web service) would reveal a hashed value that would not be easily reproduced by a man-in-the-middle attack. Furthermore, some embodiments may include a digital signature in a challenge response before encrypting the challenge response. In some embodiments, the digital signature may be based on a portion of a challenge request (e.g., a specific sequence of digits). In some embodiments, if a computer system correctly decrypts the challenge response via an associated public key, the computer system may then correctly determine the digital signature and compare the digital signature with a comparison value. For example, some embodiments may use a hashed version of the portion of the challenge request used to generate the digital signature, a value sent with a challenge response, etc. The inclusion of such additional information can increase the likelihood that a key-storing device has the correct key.

In some embodiments, a self-registering operation for a key-storing device may be used in lieu of a preregistration operation. Some embodiments may generate a new key pair from a key handle or other value of a challenge request and use the generated first key and generated second key to verify a message or authenticate a key-storing device. For example, some embodiments may use the contents of a challenge request to determine a seed value (e.g., directly use the contents as a seed value, decrypt the contents with another key on the key-storing device to determine the seed value, etc.). Some embodiments may use the seed value to deterministically generate a first key for use as a public key and a second key for use as a private key. Some embodiments may then digitally sign a response challenge with the second key and provide the first key and the response challenge to a web application. As described elsewhere, the web application may then confirm that the first key matches a public key and further that the response challenge satisfies a set of verification criteria.

Some embodiments may send the challenge response to the web service, as indicated by block 320. Some embodiments may send the challenge response to the web service during a same communication session. In some embodiments, a key-storing device may have initially been used to generate a challenge response. Some embodiments may then cause the key-storing device to transfer the challenge response to a client computer device via a physical connection (e.g., via a USB connector) or a wireless connection (e.g., via a Near Field Communication (NFC) protocol, a Bluetooth connection, etc.).

Figure 4:
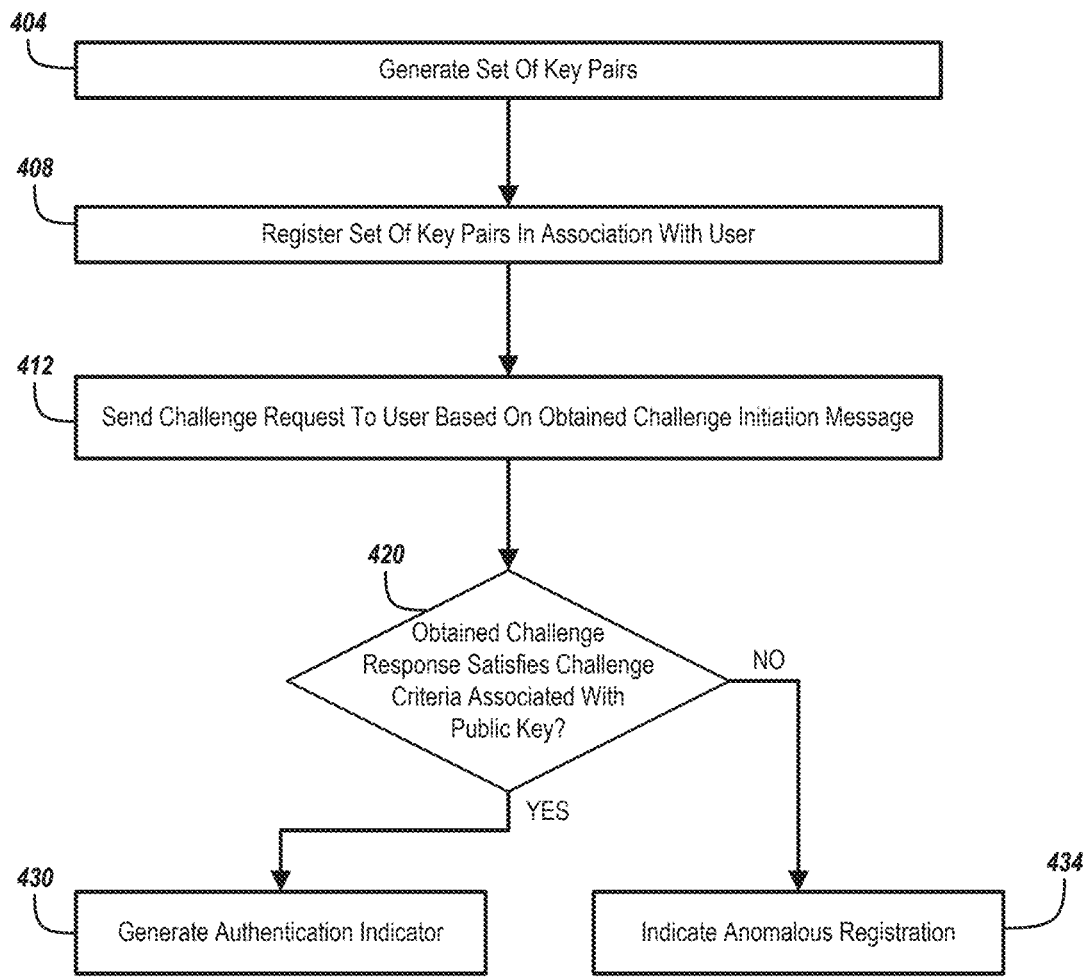
FIG. 4 shows a flowchart of a process for conducting key receipt confirmation, in accordance with one or more embodiments.

FIG. 4 shows a flowchart of a process 400 for conducting key receipt confirmation, in accordance with one or more embodiments. Some embodiments generate a set of keys or key shards, as indicated by block 404. When generating a set of keys, some embodiments may generate private-public key pairs. A computer system may use one of various key generation algorithms to generate a key and may use an OpenPGP standard encryption, which may include RSA, ElGamal, DSA, ECC, or EdDSA. Furthermore, when generating keys for a user, some embodiments may use different types of encryption algorithms. For example, some embodiments may use an RSA algorithm to determine an RSA private key and a corresponding RSA public key when determining a first private-public pair of encryption keys for a user. Some embodiments may then use an ECC algorithm to determine a second private-public pair of encryption keys for the user, where both pairs of keys or key shards generated from the pairs of keys may be associated with each other and a user identifier of the user in a database record.

Some embodiments may then generate a set of shards from one or more keys of the generated keys to determine a set of key shards. For example, some embodiments may split an RSA-generated private key into five key shards using a Shamir's Secret Sharing algorithm. Some embodiments may then generate identifiers (e.g., key handles) for each of the five different key shards for later use, such as by associating with a user with a database. Once the key shards are generated, they may be used to update a memory (e.g., a persistent memory) of a key-storing device to store a key shard on the key-storing device, where some embodiments may modify the key-storing devices such that each key-storing device has a different shard of the key. Some embodiments may delete any other stored version of a generated private key or private key shard. For example, some embodiments may generate key pair, store the key pair on a key-storing device, and assign a key identifier to the generated private key. Some embodiments may then delete any version of the generated private key of the key pair stored outside of the key-storing device and use the key identifier in lieu of the generated private key in a database record. Additionally, it should be understood that a key shard may also be used as a key in certain applications. For example, some embodiments may use an existing private key shard as its own private key and determine a corresponding public key based on the existing private key shard. In this way, a private key shard stored on a key-storing device may then be used for different applications, such that some applications may require only the private key shard and other applications may require a mandatory number of private key shards.

Some embodiments may register the set of key pairs, as indicated by block 408. When registering the set of key pairs, some embodiments may update a database or other data structure to update a record of the database or data structure. For example, some embodiments may generate or otherwise update a record associated with a user to store a public key, an identifier of the corresponding private key, or an identifier of a shard generated from the corresponding private key. Additionally, or alternatively, some embodiments may register shards generated from one or more keys of the key pairs. Furthermore, some embodiments may register one or more target applications or use cases associated with the key pair or shards generated from the key pair.

Some embodiments may generate and send a challenge request to the user based on an obtained challenge initiation message, as indicated by block 412. After receiving a challenge initiation message from a client device, some embodiments may generate a challenge request to the client device. In some embodiments, the challenge request may include an identifier to indicate a type of key or a specific key (e.g., a key handle to identify a specific key). Additionally, or alternatively, the challenge may include content used to verify a key or authenticate a key-storing device.

Some embodiments may generate one of various types of challenges, such as a random number generation challenge (e.g., to generate a nonce challenge), a hashing challenge, or a public key-based challenge. For example, some embodiments may generate, via a web service, a nonce value by randomly generating the nonce value and using the generated nonce value as a challenge request. Alternatively, or additionally, some embodiments may encrypt a value with a user's public key (e.g., a web-service-stored public key) and send the encrypted value to a client device. For example, some embodiments may retrieve a web-service-stored public key from a database accessible to the web service based on a user identifier related to a challenge initiation message. Some embodiments may then use the web service to encrypt a nonce value with the web-service-stored public key to generate a challenge request. As described elsewhere, a client device or a key-storing device in communication with the web service may then decrypt the encrypted value with a corresponding private key, perform a set of operations (e.g., perform some other arithmetic operation, add a digital signature, etc.) to generate a message result, and re-encrypt the message result with the private key. The client device may then re-send the encrypted value to the web service for use as a challenge response. For example, some embodiments may use a portion of a challenge request to generate a digital signature using a signing key. Some embodiments may then decrypt the signing key with a retrieved public key.

Some embodiments may determine whether an obtained challenge response satisfies a set of challenge criteria associated with the registered key, as indicated by block 420. Some embodiments may obtain a challenge response related to the challenge request. After receiving the challenge response, some embodiments may perform a set of operations to verify whether the challenge response demonstrates that the client device or a device connected to the client device has access to a corresponding private key. For example, if a nonce value is sent to a client device as a challenge request, some embodiments may retrieve a public key related to the challenge request to decrypt the challenge response and compare the decrypted challenge value to a hashed nonce to determine whether the appropriate private key was used for generating the challenge response. Alternatively, or additionally, some embodiments may decrypt a challenge response with a public key and further determine whether a set of expected operations (e.g., the addition of a digital signature) have been performed. Some embodiments may perform additional operations based on the expected operations (e.g., decrypting the digital signature, determining whether a decrypted web address matches a web address of the web service, etc.). For example, some embodiments may obtain a challenge response from a client that includes a digital signature.

If the obtained challenge response satisfies the set of challenge criteria associated with the registered key, operations of the process 400 may proceed to operations described for block 430. Otherwise, operations of the process 400 may proceed to operations described for block 434.

Some embodiments may update a database or parameter to indicate authentication of a device or verification of a key or key shard, as indicated by block 430. Some embodiments may use a web service to confirm the registration of the second device based on the challenge response. The web service may perform operations to indicate this confirmation. In response to this confirmation, some embodiments may update a database record associated with the confirmed key to indicate that a successful challenge response was provided. Furthermore, some embodiments may access a database or other data structure to detect an association between the confirmed key and other keys or key shards. For example, some embodiments may access a database to retrieve a database record based on the confirmed public key. Some embodiments may then use the database record to detect that a set of other keys or key shards (e.g., an encryption key shard, an encryption key that is not a shard of another key, an authentication key shard, an authentication key that is not a shard of another key, etc.) is associated with the confirmed public key. In addition, based on an association between an identifier of a key-storing device and a confirmed public key in a database record, some embodiments may then authenticate a key-storing device and indicate that the key-storing device has been physically received by an intended user.

Some embodiments may indicate an anomalous challenge response, as indicated by block 434. In response to detecting that a challenge response failed a set of verification criteria, some embodiments may perform operations to warn a user that a key or device may have been compromised. For example, some embodiments may send a warning message to a preregistered contact address associated with a user. Alternatively, or additionally, some embodiments may perform corrective actions to deactivate one or more accounts registered with a key-storing device. For example, a web service may detect that a challenge response from a client device in communication with a key-storing device has failed a set of verification criteria. In response, the web service may send a deactivation message to remove keys or key shards registered with the key-storing device from a list of registered applications or services such that the key-storing device can no longer be used to access the registered applications or services.

It is contemplated that the steps or descriptions of FIGS. 3-4 may be used with any other embodiment of this disclosure. In addition, the steps and descriptions described in relation to FIGS. 3-4 may be done in alternative orders or in parallel to further the purposes of this disclosure. For example, each of these steps may be performed in any order, in parallel, or simultaneously to reduce lag or increase the speed of the system or method. Furthermore, unless stated otherwise, some embodiments may perform some operations described in relation to FIGS. 3-4 without performing all operations described in relation to FIG. 3-4. Furthermore, it should be noted that any of the components, devices, or equipment discussed in relation to the figures above could be used to perform one or more of the steps in FIGS. 3-4.

Figure 5:
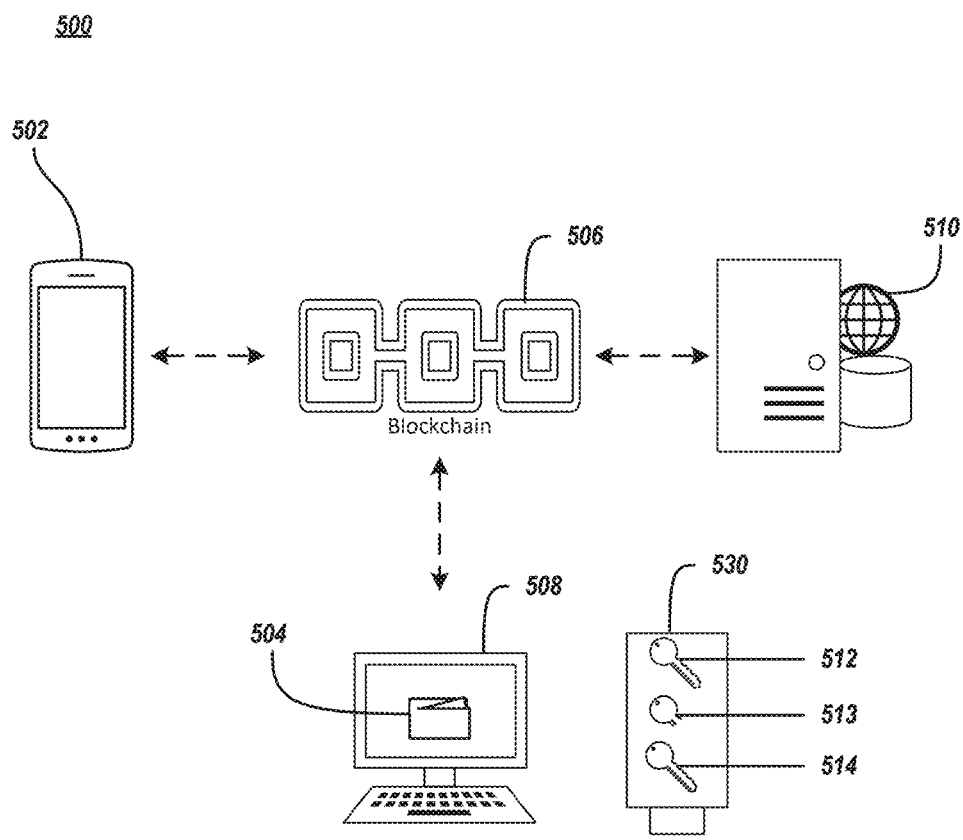
FIG. 5 shows an illustrative diagram for conducting blockchain operations using registration-confirmed keys or key shards, in accordance with one or more embodiments.

FIG. 5 shows an illustrative diagram for conducting blockchain operations using registration-confirmed keys or key shards, in accordance with one or more embodiments. A system 500 includes a set of user devices and a key-storing device 530. The key-storing device 530 includes a signing private key 512, a private key shard 513, and an additional key 514. In some embodiments, the signing private key 512 may serve to confirm that keys of the key-storing device 530 are verified using operations described in this disclosure and, thus, that the additional keys or key shards stored on the key-storing device 530 are valid. For example, some embodiments may confirm that a private key shard 513 is verified and that the additional key 514 is verified based on the signing private key 512 satisfying a set of verification criteria. Alternatively, if the signing private key 512 is used to generate a challenge response which is then determined to not satisfy a set of verification criteria, some embodiments may indicate that the key-storing device 530 is anomalous and prevent further interaction with keys or key shards stored on the key-storing device 530.

Some embodiments may use one or more keys or key shards on the key-storing device 530 to generate a digital signature. For example, the system 500 may use cryptographic systems for conducting blockchain operations, such as transmitting data to be stored on a blockchain, sending a data removal request to a smart contract, sending a verification request to a smart contract, etc. The system 500 may generate and then encrypt a message (or other blockchain operation) using an intended receiver's public key such that the encrypted message may only be decrypted with the receiver's corresponding private key (e.g., the additional key 514, another private key reconstructed from the private key shard 513 and additional private key shards, etc.). In some embodiments, the system 500 may combine a message with a private key to create a digital signature on the message. For example, the digital signature may be used to verify the authenticity of blockchain operations. For example, when conducting blockchain operations, the system 500 may use the digital signature to prove to every node in the system that it is authorized to conduct the blockchain operations.

The system 500 may include a plurality of nodes for a blockchain network supporting a blockchain 506. Each node may correspond to a user device (e.g., a user device 502, a user device 508, a user device 510). A node for a blockchain network may include an application or other software that records or monitors peer connections to other nodes or miners for the blockchain network. For example, a miner includes a node in a blockchain network that facilitates blockchain operations by verifying blockchain operations on the blockchain, adding new blocks to the existing chain, or ensuring that these additions are accurate. The nodes may continually record the state of the blockchain and respond to remote procedure requests for information about the blockchain.

In some embodiments, the user device 508 uses a digital wallet application 504 to request a blockchain operation (e.g., conduct a transaction). Alternatively, the user device 508 may permit a user to interact with a web application to cause a blockchain operation, where the user device 508 may require the use of at least one key or key shard of the key-storing device 530 to execute the operation. For example, some embodiments may use the private key shard 513 as a part of a collection of key shards to initiate a blockchain transaction. Some embodiments may implement operations that require that the private key shard 513 be verified as a registered key shard before permitting the private key shard 513 to be used. For example, some embodiments may use a web application hosted by the user device 510 to verify that the keys on the key-storing device 530 are registered before permitting the use of the key shards on the key-storing device 530.

The blockchain operation may be verified by user device 508 or another node (e.g., a user device in the community network of the system 500). For example, using cryptographic keys, the system 500 may identify users and give access to their respective user accounts (e.g., corresponding digital wallets) within the system 500. Using private keys (e.g., known only to the respective users) and public keys (e.g., known to the community network), the system 500 may create digital signatures to authenticate the users.

Following an authentication of the blockchain operation (e.g., using the signing private key 512), the blockchain operation may be authorized. For example, after the blockchain operation is verified between the users, the system 500 may authorize the blockchain operation prior to adding it to the blockchain. For example, the system 500 may add the blockchain operation to blockchain 506. The system 500 may perform this based on a consensus of the user devices within the system 500. For example, the system 500 may rely on a majority (or other metric) of the nodes in the community network (e.g., user device 502, user device 508, or user device 510) to determine that the blockchain operation is valid. For example, a blockchain operation may involve adding a new block to the blockchain 506. In response to validation of the block, a node user device (e.g., user device 502, user device 508, or user device 510) in the community network (e.g., a miner) may receive a reward (e.g., in a given cryptocurrency) as an incentive for validating the block. To validate the blockchain operation, the system 500 may use one or more validation protocols or validation mechanisms. For example, the system 500 may use a proof-of-work mechanism in which a user device must provide evidence that it performed computational work to validate a blockchain operation and thus provides a means for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into a next block of the blockchain. Alternatively, or additionally, the system 500 may use a proof-of-stake mechanism in which a user account (e.g., corresponding to a node on the blockchain network) is required to have, or "stake," a predetermined number of tokens in order for the system 500 to recognize it as a validator in the blockchain network.

In response to validation of a new block, the block is added to blockchain 506, and the blockchain operation is completed. For example, to add the blockchain operation to blockchain 506, the successful node (e.g., the successful miner) encapsulates the blockchain operation in a new block before transmitting the block throughout the system 500. Additionally, one or more devices in the system 500 may run an application (or another suitable program) to perform operations described in this disclosure. For example, an application executing on the user device 508 or the user device 510 may cause one or more processors or control circuitry to perform operations related to confirming key registration and authentication the key-storing device 530.

It should also be noted that system 500 is not limited to three devices. Users may, for instance, utilize one or more devices to interact with one another, one or more servers, or other components of system 500. It should be further noted that, while one or more operations (e.g., blockchain operations) are described herein as being performed by a particular component of system 500, those operations may, in some embodiments, be performed by other components of system 500. In some embodiments, the various computers and systems described herein may include one or more computing devices that are programmed to perform the described functions. Additionally, or alternatively, multiple users may interact with system 500 or one or more components of system 500. For example, in one embodiment, a first user and a second user may interact with system 500 using two different components (e.g., user device 502 and user device 510, respectively). Additionally, or alternatively, a single user (or a user account linked to a single user) may interact with system 500 or one or more components of system 500 using two different components (e.g., user device user device 502 and user device 508, respectively).

In some embodiments, the various computers and subsystems illustrated in FIGS. 1, 2, and 5 may include one or more computing devices that are programmed to perform the functions described herein. The computing devices may include one or more electronic storages (e.g., database(s) 132, which may include distributed database(s) 134, centralized database(s) 136, etc., or other electronic storages), one or more physical processors programmed with one or more computer program instructions, or other components. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

One or more devices described in this disclosure may receive content and data via input/output (I/O) paths using I/O circuitry. Each of these devices may also include processors or control circuitry to send and receive commands, requests, and other suitable data using the I/O paths. The control circuitry may include any suitable processing, storage, or I/O circuitry. Each of these devices may also include a user input interface or user output interface (e.g., a display) for use in receiving and displaying data. For example, as shown in FIG. 5, the user device 502 and the user device 508 include a display upon which to display data (e.g., content related to one or more blockchain operations).

The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, NFC, or other technologies). A network may include communication paths between user devices. The communication paths may include the internet, a mobile phone network, a mobile voice or data network (e.g., a 5G or LTE network), a cable network, a public switched telephone network, or other types of communications networks or combinations of communications networks. The communication paths may separately or together include one or more communications paths, such as a satellite path, a fiber optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, or firmware components operating together. For example, the computing devices may be implemented by a cloud of computing platforms operating together as the computing devices. In some embodiments, cloud components may be implemented as the cloud computing system and may feature one or more component devices.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: storing, at a first device, a first key and a second key related to registering the first key to a user; generating, by the first device, a challenge response to a challenge request using the second key; and sending the challenge response to the web service.
2. A method comprising: storing, at a first device, a first key and a second key related to registering the first key to a user; in connection with a challenge request from a web service, generating, by the first device, a challenge response to the challenge request using the second key by identifying the second key using an identifier of the challenge request; and sending the challenge response to the web service.
3. The method of any of the preceding embodiments, wherein the challenge response indicates receipt of the first key by the user to the web service.
4. A method comprising: storing, by a first device (e.g., packaged with a second device), a first key (e.g., a first key shard) and a second key related to registering the first key to a user, wherein the first key is a same key (e.g., same key shard) as a corresponding key (e.g., corresponding key shard) stored on the second device, and wherein the second key is different from a corresponding key stored on the second device, and wherein the first key and the same corresponding key are associated with the user; in connection with a challenge request from a web service, generating, by the first device, a challenge response to the challenge request using the second key by identifying the second key using an identifier of the challenge request; and sending the challenge response to the web service, wherein the web service confirms registration of the first key based on the challenge response.
5. The method of any of the preceding embodiments, wherein the challenge request from the web service is generated based on a web-service-stored public key, and wherein the web-service-stored public key is stored in association with the first key in a database of the web service.
6. The method of any of the preceding embodiments, wherein the challenge response comprises a digital signature, and wherein generating the challenge response comprises generating the digital signature based on a portion of the challenge request.
7. The method of any of the preceding embodiments, wherein: the challenge request comprises a web address; and generating the challenge response comprises hashing a hash input (e.g., where the hash input comprises the web address or other data).
8. The method of any of the preceding embodiments, wherein: generating the challenge response comprises generating the challenge response during a communication session with the web service; the communication session is associated with a session token; and sending the challenge response comprises hashing a hash input (e.g. where the hash input comprises the session token or other data).
9. The method of any of the preceding embodiments, wherein the first key or the second key is generated using an OpenPGP standard encryption.
10. The method of any of the preceding embodiments, further comprising sending a challenge initiation message to the web service, wherein the challenge initiation message indicates the first key, and wherein sending the challenge initiation message causes the web service to send the challenge request.
11. The method of any of the preceding embodiments, wherein the second key is associated with a record accessible to the web service, and wherein the challenge response causes the web service to access the record to retrieve a public key.
12. The method of any of the preceding embodiments, wherein the first key and the second key are derived from a same initial key.
13. The method of any of the preceding embodiments, wherein the challenge request comprises a set of challenge values, and wherein generating the challenge response comprises: hashing the second key to generate a hashed key comprising a first hashed key portion and a second hashed key portion; and hashing a combined value based on the first hashed key portion, wherein the combined value comprises the second hashed key portion and the set of challenge values.

14. The method of any of the preceding embodiments, wherein the first key is a Rivest-Shamir-Adleman (RSA) private key, and wherein the second key is not an RSA key.

15. The method of any of the preceding embodiments, wherein the first key is a key shard of a private key associated with a user, and wherein the challenge response indicates the user.

16. The method of any of the preceding embodiments, further comprising generating a key pair comprising the second key based on the challenge request, wherein generating the challenge response comprises generating the challenge response based on the generated second key.

17. The method of any of the preceding embodiments, wherein the challenge response comprises a digital signature, and wherein generating the challenge response comprises generating the digital signature based on a portion of the challenge request.

18. The method of any of the preceding embodiments, wherein the first device and a second device share the first key, and wherein the web service confirms registration of the second device based on the challenge response.

19. The method of embodiment 18, wherein the first device and the second device share the first key with a third device.

20. One or more tangible, non-transitory, computer-readable media storing instructions that, when executed by one or more processes, cause operations comprising those of any of embodiments 1-19.

21. A system comprising: one or more processors; and memory storing instructions that, when executed by the processors, cause the processors to effectuate operations comprising those of any of embodiments 1-19.

22. A system comprising means for performing any of embodiments 1-19.

23. A set of batteryless security devices packaged together, the set of batteryless security devices comprising: first and second devices associated with a user; wherein each of the first and second devices comprises (i) an encryption key shard that is also stored on another device of the first and second devices and (ii) an authentication key shard for registering the encryption key shard to the user for a web service, the authentication key shard being different from an authentication key shard stored on the other device, the encryption key shards and the authentication key shards of the first and second devices being (i) derived from a same key and (ii) associated with the user;

24. The set of batteryless security devices of embodiment 23, wherein the first device stores instructions that, when executed by one or more processors of the first device, cause operations comprising: in connection with a challenge request related to registering the encryption key shard of the first device to the user for the web service, identifying the authentication key shard of the first device using a key handle of the challenge request, and retrieving a signing private key and a verification public key associated with the authentication key shard; generating a challenge response to the challenge request by signing a challenge of the challenge request using the signing private key; and sending the challenge response and the verification public key generated from the key handle of the challenge request to the web service; and wherein the web service confirms registration of the encryption key shard of the first device in response to the web service verifying the challenge response using the verification public key.

25. The set of batteryless security devices of any of embodiments 23 to 24, wherein the set of batteryless security devices comprises a Universal Serial Bus connector.

26. The set of batteryless security devices of any of embodiments 23 to 25, further comprising a wireless antenna, wherein: generating the challenge response comprises generating the challenge response with a processor of the first device; and sending the challenge response comprises sending the challenge response via the wireless antenna.

What is claimed is:

1. A set of batteryless security devices packaged together for secure redundancy-based remote registration of an encryption key shard stored on the batteryless security devices via cryptographic verification of receipt of an authentication key also stored thereon, the set of batteryless security devices comprising:
   first and second devices associated with a user;
   wherein each of the first and second devices comprises (i) an encryption key shard that is also stored on another device of the first and second devices and (ii) an authentication key shard for registering the encryption key shard to the user for a web service, the authentication key shard being different from an authentication key shard stored on the other device, the encryption key shards and the authentication key shards of the first and second devices being associated with the user;
   wherein the first device comprises one or more processors and memory storing instructions that, when executed by the one or more processors of the first device, cause operations comprising:
   in connection with a challenge request related to registering the encryption key shard of the first device to the user for the web service, identifying the authentication key shard of the first device using a key handle of the challenge request, and retrieving a signing private key and a verification public key associated with the authentication key shard;
   generating a challenge response to the challenge request by signing a challenge of the challenge request using the signing private key; and
   sending the challenge response and the verification public key generated from the key handle of the challenge request to the web service; and
   wherein the web service confirms registration of the encryption key shard of the first device in response to the web service verifying the challenge response using the verification public key.

2. The set of batteryless security devices of claim 1, wherein the set of batteryless security devices comprises a Universal Serial Bus connector.

3. The set of batteryless security devices of claim 1, further comprising a wireless antenna, wherein:
   generating the challenge response comprises generating the challenge response with a processor of the first device; and
   sending the challenge response comprises sending the challenge response via the
   wireless antenna.

4. A method comprising:
- storing, by a first device packaged with a second device, a first key shard and a second key related to registering the first key shard to a user, wherein the first key shard is a same key shard as a corresponding key shard stored on the second device, and wherein the second key is different from a corresponding key stored on the second device, and wherein the first key shard and the corresponding key shard are associated with the user;
- in connection with a challenge request from a web service, generating, by the first device, a challenge response to the challenge request using the second key by identifying the second key using an identifier of the challenge request; and sending the challenge response to the web service, wherein the web service confirms registration of the first key shard based on the challenge response.

5. The method of claim 4, wherein the challenge request from the web service is generated based on a web-service-stored public key, and wherein the web-service-stored public key is stored in association with the first key shard in a database of the web service.

6. The method of claim 4, wherein the challenge response comprises a digital signature, and wherein generating the challenge response comprises generating the digital signature based on a portion of the challenge request.

7. The method of claim 4, wherein:
- the challenge request comprises a web address; and
- generating the challenge response comprises hashing a hash input, the hash input comprising the web address.

8. The method of claim 4, wherein:
- generating the challenge response comprises generating the challenge response during a communication session with the web service;
- the communication session is associated with a session token; and
- sending the challenge response comprises hashing a hash input, the hash input comprising the session token.

9. The method of claim 4, wherein the first key shard or the second key is generated using an OpenPGP standard encryption.

10. The method of claim 4, further comprising sending a challenge initiation message to the web service, wherein the challenge initiation message indicates the first key shard, and wherein sending the challenge initiation message causes the web service to send the challenge request.

11. The method of claim 4, wherein the second key is associated with a record accessible to the web service, and wherein the challenge response causes the web service to access the record to retrieve a public key.

12. One or more non-transitory computer-readable media storing instructions that, when executed by one or more processors, cause operations comprising:
- storing, by a first device packaged with a second device, a first key shard and a second key related to registering the first key shard to a user, wherein the first key shard is a same key shard as a corresponding key shard stored on the second device, and wherein the second key is different from a corresponding key stored on the second device, and wherein the first key shard and the corresponding key shard are associated with the user;
- in connection with a challenge request from a web service, generating, by the first device, a challenge response to the challenge request using the second key by identifying the second key using an identifier of the challenge request; and
- sending the challenge response to the web service,
- wherein the web service confirms registration of the first key shard based on the challenge response.

13. The one or more media of claim 12, wherein the first key shard and the second key are derived from a same initial key.

14. The one or more media of claim 12, wherein the challenge request comprises a set of challenge values, and wherein generating the challenge response comprises:
- hashing the second key to generate a hashed key comprising a first hashed key portion and a second hashed key portion; and
- hashing a combined value based on the first hashed key portion, wherein the combined value comprises the second hashed key portion and the set of challenge values.

15. The one or more media of claim 12, wherein the first key shard is a Rivest-Shamir-Adleman (RSA) private key, and wherein the second key is not an RSA key.

16. The one or more media of claim 12, wherein the first key shard is a key shard of a private key associated with the user, and wherein the challenge response indicates the user.

17. The one or more media of claim 12, the operations further comprising generating a key pair comprising the second key based on the challenge request, wherein generating the challenge response comprises generating the challenge response based on the generated second key.

18. The one or more media of claim 12, wherein the challenge response comprises a digital signature, and wherein generating the challenge response comprises generating the digital signature based on a portion of the challenge request.

19. The one or more media of claim 12, wherein the first device and the second device share the first key shard, and wherein the web service confirms registration of the second device based on the challenge response.

20. The one or more media of claim 19, wherein the first device and the second device share the first key shard with a third device.

* * * * *